3,284,464
3,5-BIS(TRIFLUOROMETHYL)PYRAZOLE

Milton Wolf, Chester, Pa., assignor to American Home Products Corporation, New York, N.Y., a corporation of Delaware
No Drawing. Filed Dec. 26, 1963, Ser. No. 333,623
1 Claim. (Cl. 260—310)

This invention relates to a novel pharmaceutically active composition. More particularly, this invention relates to 3,5-bis(trifluoromethyl)pyrazole and to the method by which such a compound is prepared.

The new compound of the present invention, namely 3,5-bis(trifluoromethyl)pyrazole, has been found to be unexpectedly effective as a hyperglycemic agent. The new compound considered in its broadest aspect is prepared according to the method of the present invention by adding hydrazine with stirring to a solution of hexafluoroacetylacetone maintained in an inert solvent in substantially equimolar amount. Following the initial vigorous reaction, the resulting clear solution is refluxed and concentrated in vacuo to yield an oil which on distillation provides a colorless solid, the new product of the present invention.

The new compound of the present invention is useful for its valuable pharmaceutical properties. More specifically, the compound of the present invention is useful as a hyperglycemic agent. When used as a hyperglycemic agent, the compound of the present invention is preferably formed into a pharmaceutical preparation.

The latter contains the specified compound in admixture with a pharmaceutically administrable organic or inorganic carrier, such that the composition is suitable for enteral or parenteral administration. The composition may be prepared in solid form, such as in tablets, or in liquid form such as a solution, suspension or emulsion. Suitable liquid carriers include water, gelatin, lactose, starch, talc, vegetable oils, alcohols, polyalcohols, gums, USP syrups and the like. The pharmaceutical composition in addition to the active principle and the carrier may include auxiliary materials such as coloring, stabilizing, wetting or emulsifying agents. It is of course recognized as essential that the carrier as well as any other materials present with the active principle be inert with respect thereto.

When the pharmaceutical preparation is compounded in the manner suggested above, the active compound will be present in an amount of from about 1 to about 500 mg./cc. of the vehicle. Preferably the active compound will be present in an amount of from 1 to about 100 mg./cc. of the carrier. When so prepared, the new compound may be administered in therapeutic dosage amounts, depending on the condition being treated in an amount of from about 10 mg. to 600 mg./day of the active material.

Reference to the specific example which follows will provide a better understanding of the method by which the new compound of the present invention is prepared.

Hydrazine (1.54 g.[1.60 ml.], 0.0480 m.) is added dropwise with stirring to a solution of hexafluoroacetylacetone (10.00 g., 0.0480 ml.) in tetrahydrofuran (10 ml.). After the initial vigorous reaction subsided, the clear solution was refluxed for one hour, then concentrated in vacuo yielding a pale yellow oil. Distillation of the oil gave 0.90 g. (9.2%) of a colorless solid, 3,5-bis(trifluoromethyl) pyrazole, M. 70–75° C. (uncorr.).

*Analysis.*—Calc'd. for $C_5H_2F_6N_2$: C, 29.43; H, 0.99; N, 13.72. Found: C, 29.09; H, 1.39; N, 12.70.

A further aspect of the present invention is the use of the new compound thereof in the preparation of compounds having properties which make them useful as pharmaceuticals in applications similar to that described for the subject compound.

It has been found that if a substituted hydrazide compound, preferably a sulfonhydrazide, is reacted with hexafluoroacetylacetone in a manner similar to that described above, a sulfonyl-3,5-bis(trifluoromethyl)pyrazole is obtained. This reaction is carried out with a selected sulfonhydrazide in an ice bath and requires from ¼ hour to about 2 hours. The reaction is then permitted to go to completion at room temperature. This normally requires an additonal period of from 3 to 10 hours. The reaction mixture is extracted with ether, washed with water and saturated salt solution, and concentrated in vacuo. The sulfonhydrazides suitable for this purpose include the alkyl, aryl, alkaryl, thienyl, furyl, naphthyl and similar sulfonhydrazides. Preferred among the latter are the phenyl sulfonhydrazides and substituted derivatives thereof such as the halogenated phenyl, aminophenyl, alkoxyphenyl and nitrophenylsulfonhydrazides.

While the foregoing invention has been described with some degree of particularity in the specific example above, it is to be understood that the invention is not to be limited thereby but is only to be limited by the claim appended hereto.

The invention claimed is:
3,5-bis(trifluoromethyl)pyrazole.

References Cited by the Examiner
UNITED STATES PATENTS

| | | | |
|---|---|---|---|
| 1,879,210 | 9/1932 | Hahl | 260—310 |
| 2,831,866 | 4/1958 | Freeman et al. | 260—310 |
| 2,833,779 | 5/1958 | Fields et al. | 260—310 |
| 3,200,128 | 8/1965 | Wagner | 260—310 |

OTHER REFERENCES

Elderfield: Heterocyclic Compounds, vol. 5, pages 47–50, New York, Wiley, 1957.

WALTER A. MODANCE, *Primary Examiner.*

NATALIE TROUSOF, *Assistant Examiner.*